(12) United States Patent
Niwa et al.

(10) Patent No.: US 10,309,283 B2
(45) Date of Patent: Jun. 4, 2019

(54) EXHAUST DEVICE OF ENGINE

(71) Applicant: Mazda Motor Corporation, Aki-gun, Hiroshima (JP)

(72) Inventors: Yasushi Niwa, Higashihiroshima (JP); Kazuya Niida, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 104 days.

(21) Appl. No.: 15/617,961

(22) Filed: Jun. 8, 2017

(65) Prior Publication Data
US 2017/0362986 A1   Dec. 21, 2017

(30) Foreign Application Priority Data
Jun. 20, 2016  (JP) ................................ 2016-121477

(51) Int. Cl.
  *F01N 3/28*    (2006.01)
  *F01N 13/10*   (2010.01)
  *F01N 13/14*   (2010.01)
  *F01N 13/18*   (2010.01)
  *F01N 3/04*    (2006.01)

(52) U.S. Cl.
  CPC ........... *F01N 3/2839* (2013.01); *F01N 3/046* (2013.01); *F01N 13/10* (2013.01); *F01N 13/14* (2013.01); *F01N 13/1805* (2013.01); *Y02T 10/20* (2013.01)

(58) Field of Classification Search
  CPC .... F01N 13/10; F01N 13/105; F01N 13/1805; F01N 13/1827; F02F 11/002
  See application file for complete search history.

(56) References Cited

U.S. PATENT DOCUMENTS

| 5,944,322 A  * | 8/1999 | Coff ....................... F16J 15/127 |
| | | 277/594 |
| 6,279,965 B1 * | 8/2001 | Kida ..................... F16L 27/053 |
| | | 285/268 |

(Continued)

FOREIGN PATENT DOCUMENTS

| JP | 54051214 U1 | 4/1979 |
| JP | 08004901 A  | 1/1996 |
| JP | 08144849 A  | 6/1996 |

(Continued)

*Primary Examiner* — Audrey K Bradley
(74) *Attorney, Agent, or Firm* — Alleman Hall Creasman & Tuttle LLP

(57) ABSTRACT

An exhaust device of an engine is provided, which includes an exhaust port formed in a cylinder head and connected to an exhaust aperture of a cylinder, an exhaust manifold disposed on a side surface of the cylinder head and formed with a first exhaust passage, an exhaust path constituting part disposed on a side of the exhaust manifold opposite from the cylinder head, and formed with a second exhaust passage, a catalyst disposed on a downstream side of the exhaust path constituting part, an upstream gasket disposed between the side surface of the cylinder head and an upstream connecting member of the manifold, and a downstream gasket disposed between a downstream connecting member of the manifold and an exhaust-manifold-side connecting member of the exhaust path constituting part. The upstream gasket has a larger thermal resistance in an exhaust gas flow direction than the downstream gasket.

4 Claims, 11 Drawing Sheets

(56) References Cited

U.S. PATENT DOCUMENTS

2016/0040783 A1* 2/2016 Kullen .................. F16J 15/064
                                                        277/608
2016/0223085 A1* 8/2016 Yamazaki ............ F16J 15/0818

FOREIGN PATENT DOCUMENTS

| JP | 2002276810 A | 9/2002 |
| JP | 2008291833 A | 12/2008 |
| JP | 2014020512 A | 2/2012 |
| JP | 2012145065 A | 8/2012 |
| JP | 2015187454 A | 10/2015 |

* cited by examiner

EXHAUST DEVICE OF ENGINE

BACKGROUND

The present invention relates to an exhaust device of an engine.

To stimulate a catalytic reaction when starting a turbocharged engine, it is known to open a wastegate valve to introduce a flow of high-temperature exhaust gas into a catalyst casing.

If a variable geometry turbocharger is adopted, since this type of turbocharger is not provided with a wastegate valve, a different approach is required for the stimulation of the catalytic reaction.

One example of a different approach is to prevent a temperature drop of the exhaust gas between a discharge from combustion chambers and an introduction into the catalyst casing.

Here, when the exhaust gas passes through exhaust ports formed in a cylinder head, due to a temperature difference between the exhaust gas and a coolant in a coolant passage formed around the exhaust ports, the heat of the exhaust gas is absorbed by the cylinder head structure and the coolant. To prevent this absorption, for example, JP2012-145065A discloses an air-cooled exhaust manifold formed as a separate body from the cylinder head and located downstream of the exhaust ports.

With the structure disclosed in JP2012-145065A, since the cylinder head has a lower temperature than the exhaust manifold due to the coolant, based on the heat transfer principles in structures, the heat may be transferred from the exhaust manifold toward the cylinder head and the exhaust gas temperature may decrease, which leaves room for further improvement.

SUMMARY

The present invention is made in view of the above issues and aims to provide an exhaust device of an engine that prevents a temperature drop of exhaust gas between a discharge from combustion chambers and an introduction into a catalyst casing to stimulate catalytic reaction.

In order to achieve the above aim, in the present invention, an upstream gasket provided between a cylinder head and an exhaust manifold is structured to have a larger thermal resistance in an exhaust gas flow direction than that at a downstream gasket provided between the exhaust manifold and an exhaust path constituting parts.

That is, according to one aspect of the present invention, an exhaust device of an engine is provided, which includes an exhaust port formed in a cylinder head and connected to an exhaust aperture of a cylinder at a first open end, an exhaust manifold disposed on a side surface of the cylinder head and formed with a first exhaust passage connected to a second open end of the exhaust port opposite from the first open end, an exhaust path constituting part disposed on a side of the exhaust manifold opposite from the cylinder head, and formed with a second exhaust passage connected to a downstream end of the first exhaust passage, an exhaust gas purifying catalyst device disposed downstream of the exhaust path constituting part, an upstream gasket disposed between the side surface of the cylinder head and an upstream connecting member of the exhaust manifold, and a downstream gasket disposed between a downstream connecting member of the exhaust manifold and an exhaust-manifold-side connecting member of the exhaust path constituting part, the upstream gasket having a larger thermal resistance in an exhaust gas flow direction than the downstream gasket.

Typically, a water jacket is formed near an upper part of a combustion chamber and the exhaust port so as to cool the exhaust gas and the cylinder head structure in a high engine load operation. At the engine start, since the heat of the exhaust gas is easily absorbed by a coolant on the cylinder head side from the exhaust manifold, which is air-cooled, a reaction of the exhaust gas purifying catalyst device disposed on the downstream side may be slowed down.

According to the present invention, the upstream gasket in the exhaust gas flow direction is structured to have the larger thermal resistance than the downstream gasket, and thus, the absorption of the heat of the exhaust gas by the cylinder head from the exhaust manifold at the engine start is prevented. As a result, the heat of the exhaust gas flowing downstream from the exhaust manifold is retained, and the second exhaust passage of the exhaust path constituting part and the exhaust gas purifying catalyst device are promptly warmed up to stimulate the catalytic reaction.

The upstream and downstream gaskets may be made from substantially the same materials. The upstream gasket may be thicker than the downstream gasket in the exhaust gas flow direction.

According to the structure, by adjusting thicknesses of the upstream and downstream gaskets in the exhaust gas flow direction, the thermal resistance of the upstream gasket in the exhaust gas flow direction is adjusted to be larger than that of the downstream gasket with a simple structure.

Here, the definition of "substantially the same materials" includes the materials being exactly the same, and specifically indicates that the two members are made from materials so that the thermal resistance of one of the two members in the exhaust gas flow direction is different from the thermal resistance of the other member within a range of ±5% of the value of the thermal resistance of the other member.

The upstream gasket may include a plurality of upstream seal plates stacked in a direction parallel to the exhaust gas flow direction, each of the plurality of upstream seal plates being formed with a through-hole to form a third exhaust passage therein. The downstream gasket may include a plurality of downstream seal plates stacked in a direction parallel to the exhaust gas flow direction, each of the plurality of downstream seal plates being formed with a through-hole to form the third exhaust passage therein. The plurality of upstream seal plates and the plurality of downstream seal plates may be made from substantially the same materials and have substantially the same thicknesses. A number of the plurality of upstream seal plates may be larger than a number of the plurality of downstream seal plates.

According to the structure, by adjusting the numbers of the plurality of upstream and downstream seal plates, the thermal resistance of the upstream gasket in the exhaust gas flow direction is adjusted to be larger than that of the downstream gasket with a simple structure.

Here, the definition of "substantially the same thicknesses" includes the thicknesses being exactly the same, and specifically indicates that the two plate members have thicknesses so that the thickness of one of the two members is different from the thickness of the other member within a range of ±5% of the value of the thickness of the other member.

The downstream gasket may include a grommet plate disposed between two of the plurality of downstream seal plates. The grommet plate may be formed with a passage hole forming the third exhaust passage together with the through-holes of the plurality of downstream seal plates. The grommet plate may be provided with a folded portion formed at the passage hole side by folding the grommet plate to cover an inner circumferential portion of one downstream seal plate adjacent to the grommet plate, the inner circumferential portion forming the through-hole.

The inner circumferential portion forming the through-hole of the downstream gasket may degrade in sealability because of a decrease in elasticity of a bead portion due to exposure to the high-temperature exhaust gas flowing through the through-hole as the third exhaust passage. In addition, unlike the upstream gasket, the downstream gasket does not have a coolant part near one end side thereof such as the cylinder head water jacket. According to the above structure, since the grommet plate is folded at the passage hole side to cover the inner circumferential portion of the downstream seal plate, even when the elasticity of the bead portion is decreased, since the folded portion is provided, the bead portion is not completely crushed and a surface pressure is maintained. Therefore, excellent sealability is maintained even when being exposed to the high-temperature exhaust gas.

The upstream gasket may include an insulator plate having an extended portion extending outwardly of the upstream gasket and disposed between two of the plurality of upstream seal plates.

According to the structure, an additional attaching part for attaching the insulator plate covering the exhaust manifold is not required, and the discharge of heat from the exhaust manifold is effectively prevented with a simple structure.

DETAILED DESCRIPTION OF EMBODIMENTS

Hereinafter, embodiments of the present invention are described in detail with reference to the drawings. The following embodiments are merely examples and in no way intended to limit the present invention, its application, or its usage.

First Embodiment
Diesel Engine

Figure 1:
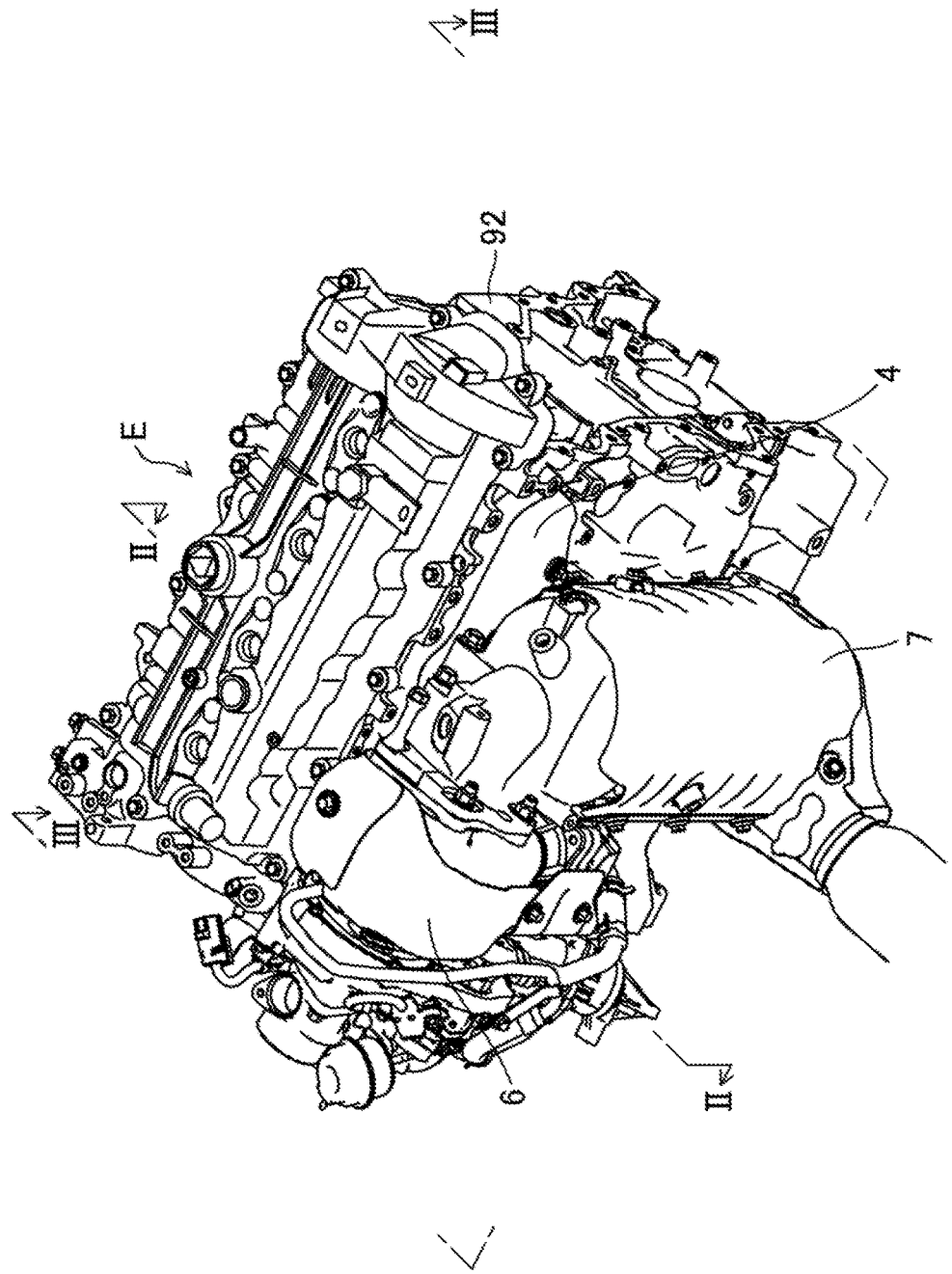
FIG. 1 is a perspective view schematically illustrating a structure of a diesel engine including an exhaust device according to a first embodiment of the present invention.
Figure 2:
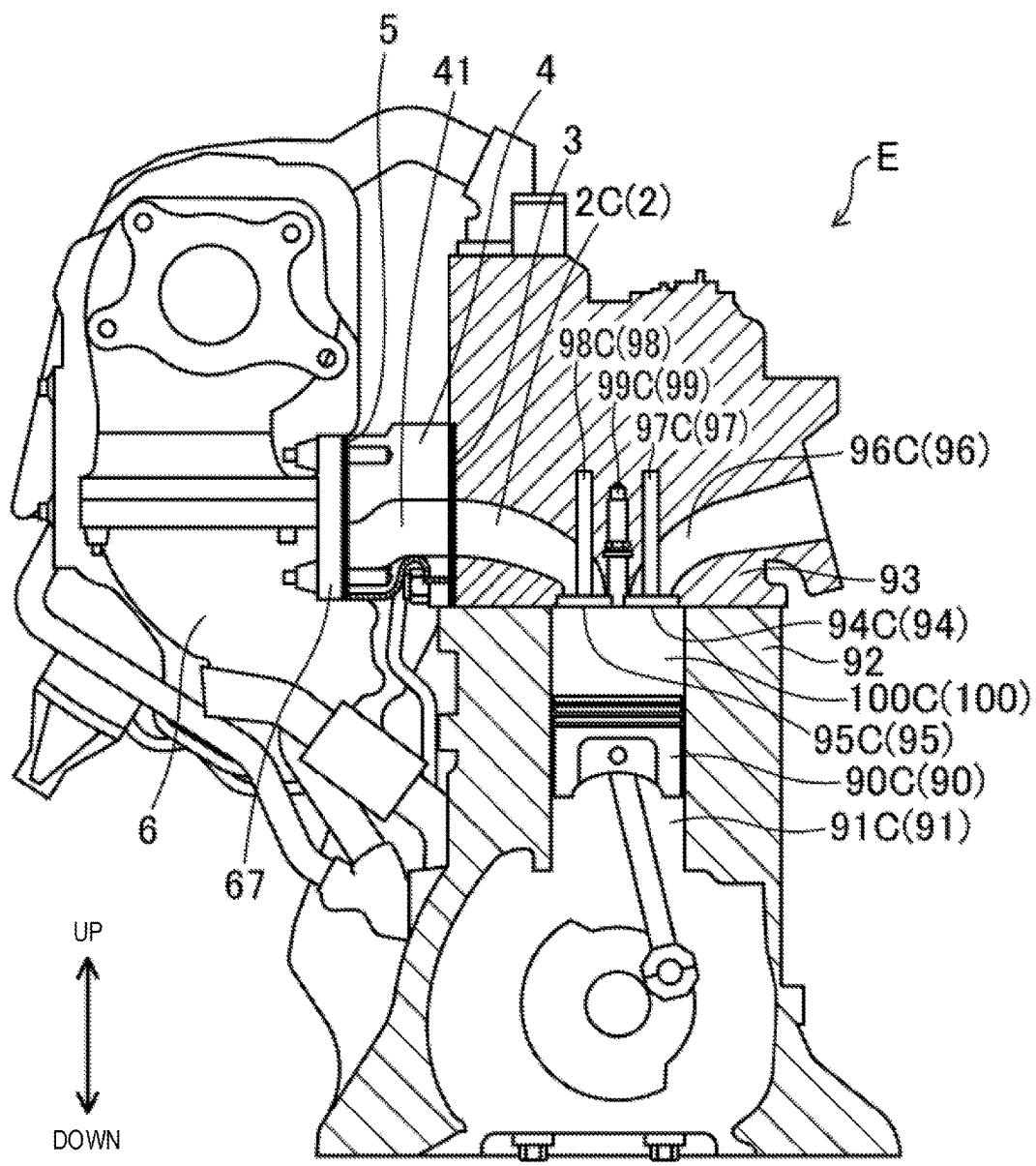
FIG. 2 is a schematic cross-sectional view of the diesel engine taken along the line II-II of FIG. 1.
Figure 3:
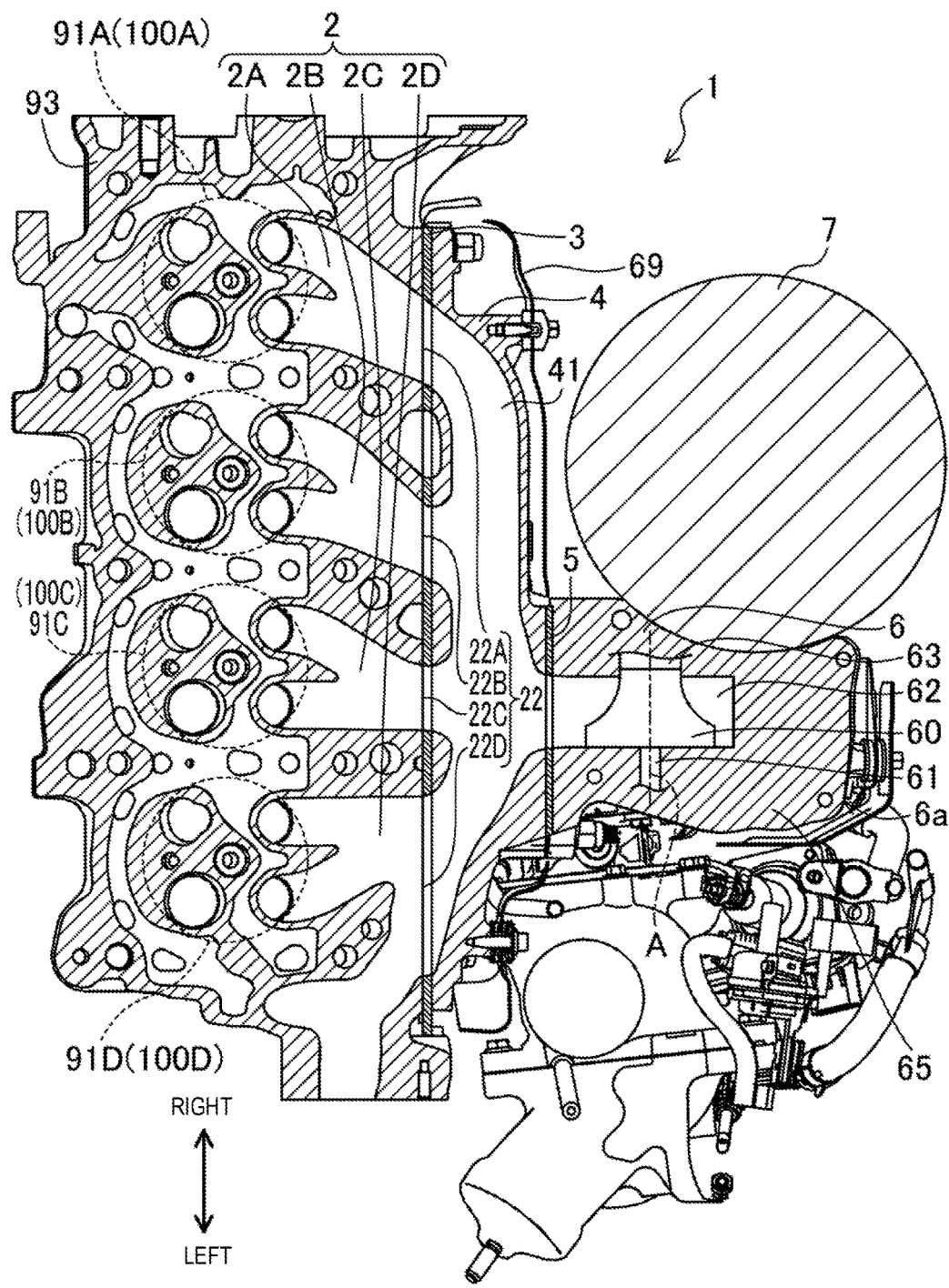
FIG. 3 is a schematic cross-sectional view of the diesel engine taken along the line of FIG. 1.

As illustrated in FIGS. 1 to 3, an engine E to which an exhaust device 1 of this embodiment is applied is an inline four-cylinder diesel engine mounted on an automobile. First to fourth four cylinders 91A, 91B, 91C, and 91D are arranged in line in a direction orthogonal to the sheet of FIG. 2 which is a schematic cross-sectional view of the third cylinder 91C taken along the line II-II of FIG. 1. Hereinafter, the structure of the engine E is described using the third cylinder 91C as an example. "92" is a cylinder block, "93" is a cylinder head, and "90C" is a third piston. The cylinder block 92, the cylinder head 93, and a crown surface of the third piston 90C form a third combustion chamber 100C.

A third intake aperture 94C and a third exhaust aperture 95C are formed in a wall of the cylinder head 93 at positions corresponding to the third combustion chamber 100C. The third intake aperture 94C and the third exhaust aperture 95C are connected with a third intake port 96C and a third exhaust port 2C, respectively, which are formed in the cylinder head 93. The third intake port 96C is opened and closed by a third intake valve 97C, and the third exhaust port 2C is opened and closed by a third exhaust valve 98C.

A third injector 99C for directly injecting fuel into the third cylinder 91C is attached to the cylinder head 93 at a substantially center of the third combustion chamber 100C in its radial directions. The arrangement of the third injector 99C may suitably be changed.

The structure of the third cylinder 91C applies to the other first, second and fourth cylinders 91A, 91B, and 91D. Hereinafter, as indicated in the parentheses in FIG. 2, the components of the above structure may simply be referred to as the cylinder 91, the piston 90, the combustion chamber 100, the intake aperture 94, the exhaust aperture 95, the intake port 96, the exhaust port 2, the intake valve 97, the exhaust valve 98, and the injector 99, unless the respective cylinders need to be distinguished.

In the following description, "up-and-down directions" indicate directions in which the cylinder head 93 side is the upper side and the cylinder block 92 side is the lower side with reference to the engine E as illustrated in FIG. 2. Additionally, "left-and-right directions" are in parallel to an arranged direction of the cylinders 91 (cylinder line-up direction) with reference to the engine E as illustrated in FIG. 3. Further, "upstream" and "downstream" directions are taken with reference to the direction in which the exhaust gas discharged from the combustion chamber 100 through the exhaust aperture 95 flows.

Exhaust Device

In FIGS. 1 to 4, the exhaust device 1 of this embodiment includes the exhaust ports 2, an exhaust manifold 4 disposed downstream of the exhaust ports 2, a turbocharger (exhaust path constituting part) 6 disposed downstream of the exhaust manifold 4, and a catalyst device (exhaust gas purifying catalyst device) 7 disposed downstream of the turbocharger 6.

Figure 4:
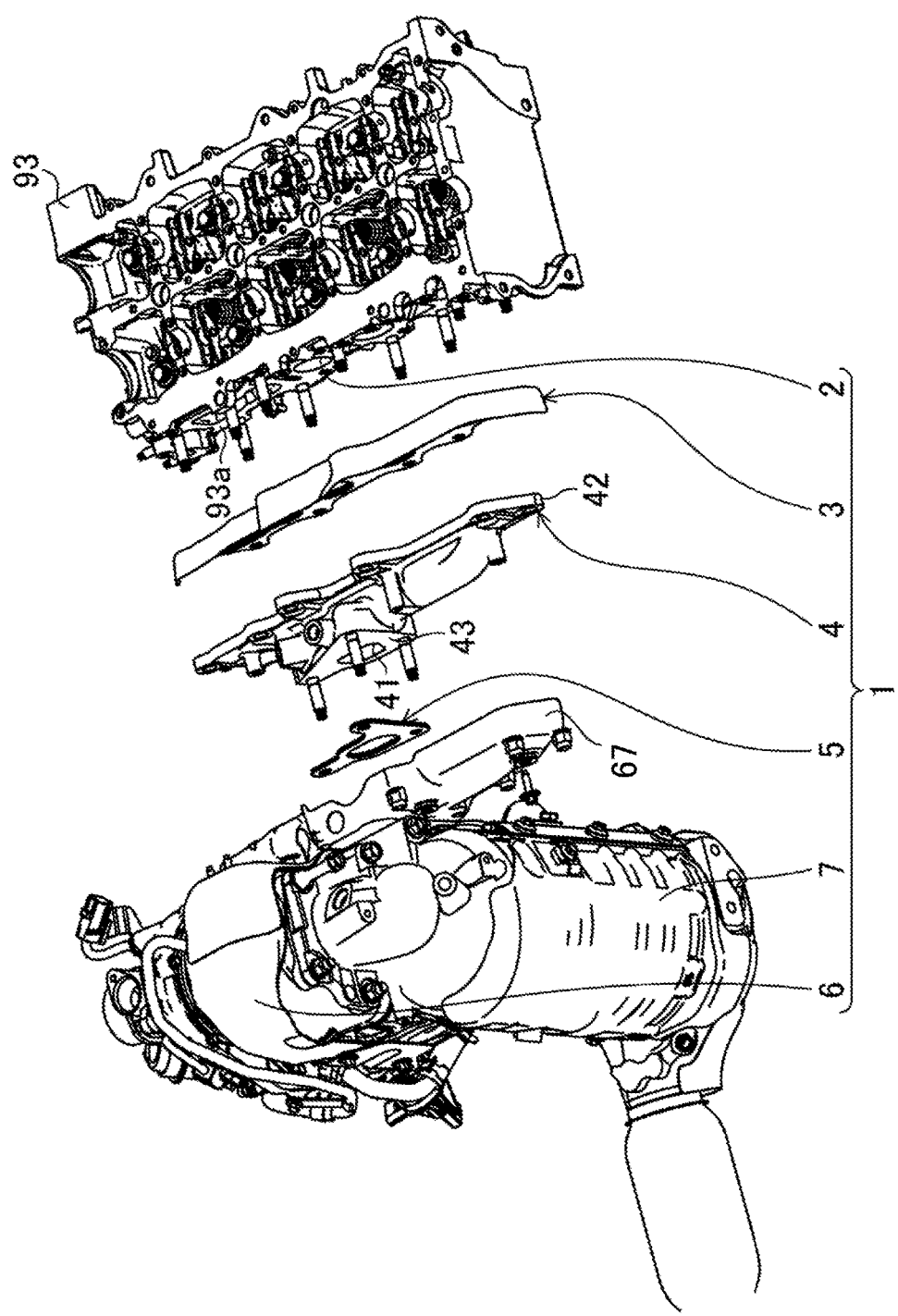
FIG. 4 is an exploded perspective view schematically illustrating an arrangement of various components of the exhaust device of FIG. 1 for assembly.

As illustrated in FIGS. 2 to 4, the exhaust device 1 includes an upstream gasket 3 provided between a connecting part 93a of a side surface of the cylinder head 93 and an upstream flange (upstream connecting member) 42 of the exhaust manifold 4.

Additionally, the exhaust device 1 includes a downstream gasket 5 provided between a downstream flange (downstream connecting member) 43 of the exhaust manifold 4 and an exhaust-manifold-side flange (exhaust-manifold-side connecting member) 67 of the turbocharger 6.

<Exhaust Port>

As illustrated in FIGS. 2 and 3, the exhaust ports 2 include a first exhaust port 2A, a second exhaust port 2B, the third exhaust port 2C, and a fourth exhaust port 2D connected to a first combustion chamber 100A, a second combustion chamber 100B, the third combustion chamber 100C, and a fourth combustion chamber 100D formed in the first to fourth cylinders 91A to 91D, respectively. Note that FIG. 3 is a schematic cross-sectional view taken along the line III-III of FIG. 1, and as indicated by dashed lines in the drawing, the respective cylinders 91A to 91D are located on the lower side of the cylinder head 93 in FIG. 3, i.e., on the back side of the sheet of FIG. 3. As described above, the combustion chambers 100A to 100D (the reference characters are denoted in parentheses in FIG. 3) are formed in the cylinders 91, respectively.

A water jacket (not illustrated) is formed on the upper and lower sides of the exhaust ports 2, i.e., in a part of the cylinder head 93 above the combustion chambers of the engine and near the exhaust ports 2, so as to cool the exhaust gas and the cylinder head structure with the coolant in a high engine load operation.

<Exhaust Manifold>

The exhaust manifold 4 is connected to the connecting part 93a of the side surface of the cylinder head 93.

As illustrated in FIG. 3, an internal gas passage (first exhaust passage) 41 is formed inside the exhaust manifold 4. The internal gas passage 41 is connected to open ends 22A, 22B, 22C, and 22D (collectively, open ends 22) of the exhaust ports 2A to 2D on the opposite side from the exhaust apertures (on the downstream side). The internal gas passage 41 has a plurality of upstream end portions connected to the exhaust ports 2A to 2D of the cylinders 91, respectively, and a merging section formed in a downstream portion and where the upstream end portions merge with each other, and is communicated with the turbocharger 6. In other words, the exhaust gas discharged from the combustion chambers 100 of the cylinders 91 passes through the corresponding exhaust ports 2 to merge in the internal gas passage 41, and is introduced into a turbine scroll 62 (described later) of the turbocharger 6.

As illustrated in FIGS. 1 and 3, the catalyst device 7 for purifying the exhaust gas is provided downstream of the turbocharger 6. To promptly react the catalyst device 7, the exhaust manifold 4 is designed as an air-cooling type which does not have a coolant passage, so that a high temperature exhaust gas is introduced into the catalyst device 7.

<Turbocharger>

The turbocharger 6 is connected to a side of the exhaust manifold 4 opposite from the cylinder head 93. The turbocharger 6 is formed with an exhaust passage connected to a downstream end of the internal gas passage 41 of the exhaust manifold 4. This exhaust passage includes the turbine scroll (second exhaust passage) 62 and a turbine flow-out passage (second exhaust passage) 63 connected to the downstream side of the turbine scroll 62. The exhaust gas discharged from the internal gas passage 41 of the exhaust manifold 4 is introduced into the catalyst device 7 provided downstream of the turbocharger 6, through the turbine scroll 62 and the turbine flow-out passage 63.

The turbocharger 6 turbocharges intake air by using the energy of the exhaust gas to increase the output of the engine E. That is, the engine E of this embodiment operates the turbocharger 6 by using the exhaust gas discharged through the exhaust manifold 4, so as to increase the pressure of the intake air introduced into each of the cylinders 91A to 91D. The flow rate and dynamic pressure of the exhaust gas introduced into the turbocharger 6 are controlled by the exhaust valves 98 according to an operating state of the automobile. Thus, the effect of the turbocharger 6 to raise the engine torque is obtained over a wide engine speed range from low to high speeds.

In this embodiment, the turbocharger 6 is a variable geometry turbocharger that does not have a wastegate valve.

For example, the turbocharger 6 is comprised of a turbine 6a and a compressor (not illustrated) disposed in an intake passage. The turbine 6a generates a drive force by being rotated by the exhaust gas discharged from the engine E, and the drive force drives the compressor to increase the intake air pressure. As illustrated in FIG. 3, the turbine 6a is comprised of a turbine housing 65 and a turbine wheel 60. Note that in order to prevent a temperature drop of the exhaust gas in the turbocharger 6 and stimulate the reaction of the catalyst device 7 located downstream of the turbocharger 6, the turbine housing 65 of the turbocharger 6 is made of sheet metal having a small heat capacity.

A coupling shaft 61 extending through a left part of the turbine housing 65 is fixed to a back side (left side) of the turbine wheel 60. The turbine wheel 60 is coupled to the compressor via the coupling shaft 61, and is rotatable about a rotation axis A. A right part of the turbine housing 65 which opposes to a front side (right side) of the turbine wheel 60 is formed with the turbine flow-out passage 63 extending in parallel to the rotation axis A.

The exhaust gas introduced from the internal gas passage 41 into the turbine scroll 62 and rotated by the turbine scroll 62 is discharged from the turbocharger 6 through the turbine flow-out passage 63 and introduced into the catalyst device 7 disposed downstream thereof.

<Catalyst Device>

The catalyst device 7 purifies the exhaust gas discharged from the combustion chambers 100. Although not illustrated, the catalyst device 7 includes a catalyst body and a casing accommodating the catalyst body. The catalyst body purifies hazardous components within the exhaust gas. The catalyst body is, for example, a PM (Particulate Matter) oxidation catalyst (catalyst-supporting DPF (Diesel Particulate Filter)) or a $NO_x$ (Nitrogen Oxide) catalyst.

The catalyst device 7 is attached to a position near the turbocharger 6 on the downstream side and directly connected to the turbine flow-out passage 63 of the turbocharger 6. Therefore, when high-temperature exhaust gas is discharged downstream from the turbine flow-out passage 63 of the turbocharger 6, the high-temperature exhaust gas flows into the catalyst device 7. Thus, the catalyst body promptly reacts and the reactive state of the catalyst body is reliably maintained.

<Upstream Gasket>

The upstream gasket 3 improves sealability on the exhaust passage formed by the exhaust ports 2 and the internal gas passage 41 of the exhaust manifold 4, and prevents leakage of the exhaust gas from the connected part between the cylinder head 93 and the exhaust manifold 4.

Figure 5:
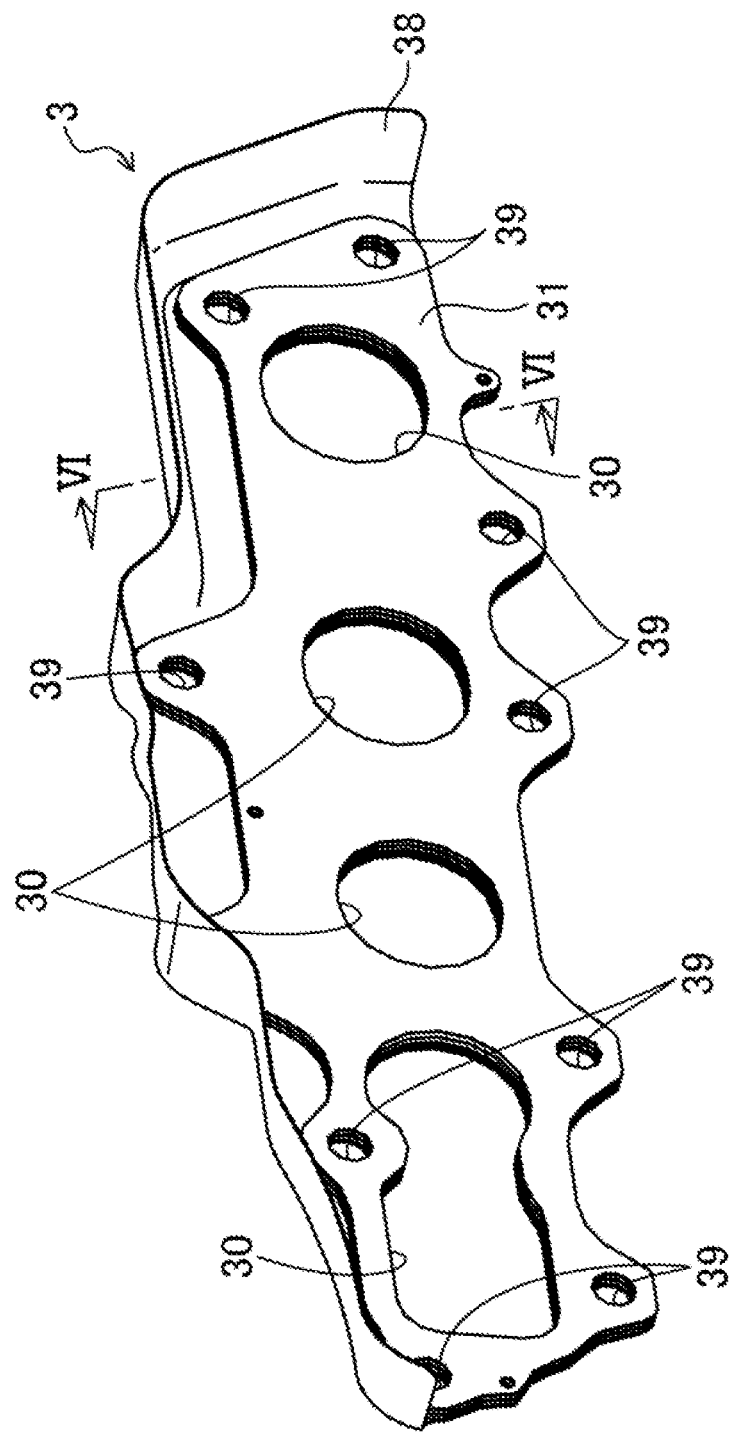
FIG. 5 is a perspective view of an upstream gasket of FIG. 4.
Figure 6:
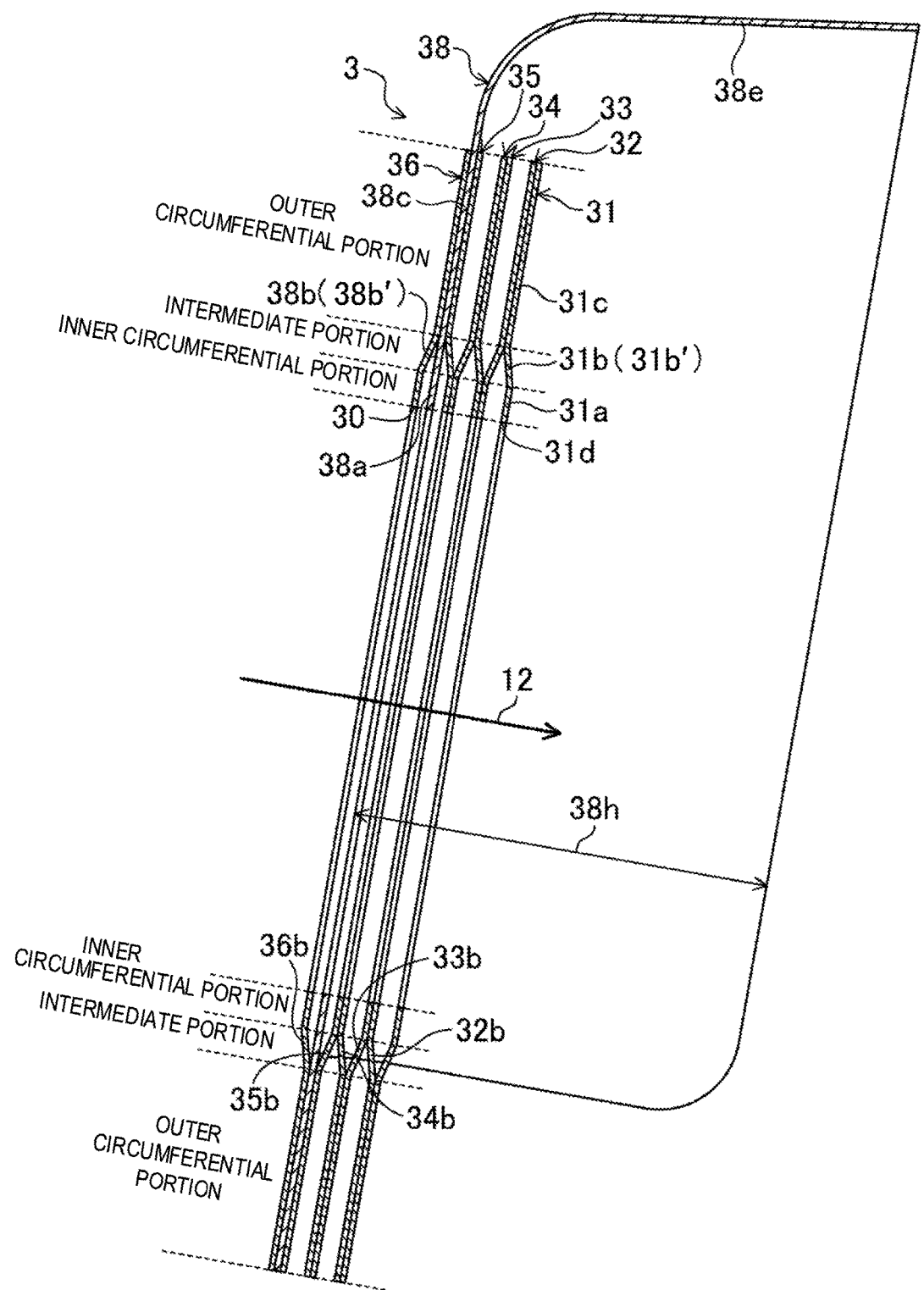
FIG. 6 is a cross-sectional view of the upstream gasket taken along the line VI-VI of FIG. 5.
Figure 7:
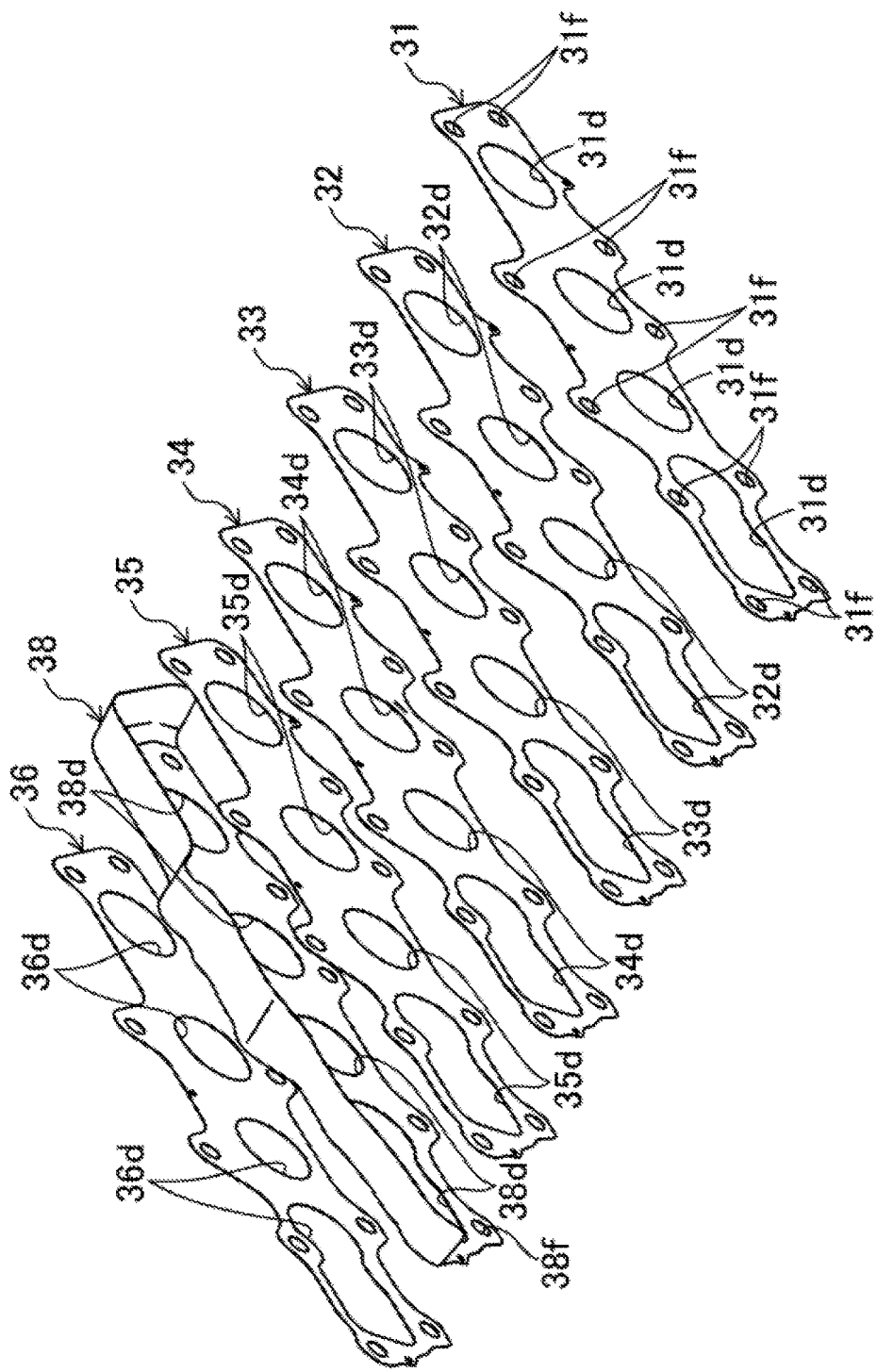
FIG. 7 is an exploded perspective view illustrating a stacking structure of the upstream gasket of FIG. 5.

Specifically, as illustrated in FIGS. 5 to 7, the upstream gasket 3 has an annular structure formed with through-holes 30 at an inner circumferential side. A plurality of bolt holes 39 are formed on an outer circumferential side of the through-holes 30 to spread therearound. As illustrated in FIGS. 3 and 4, the upstream gasket 3 is disposed between the connecting part 93a of the cylinder head 93 and the upstream flange 42 of the exhaust manifold 4, and assembled with them by fastening a plurality of bolts (not illustrated) through the plurality of bolt holes 39. In the assembled state, the exhaust passage (third exhaust passage) is formed within the through-holes 30 formed at the inner circumferential side of the upstream gasket 3.

As illustrated in FIGS. 5 to 7, the upstream gasket 3 includes six upstream seal plates and an insulator plate 38 disposed between two of the upstream seal plates. The six upstream seal plates include a first upstream seal plate 31, a second upstream seal plate 32, a third upstream seal plate 33, a fourth upstream seal plate 34, a fifth upstream seal plate 35, and a sixth upstream seal plate 36 (hereinafter, may comprehensively be referred to as "the upstream seal plates 31 to 36").

Through holes 31d, 32d, 33d, 34d, 35d, and 36d are formed in the upstream seal plates 31 to 36 at their inner circumferential sides. The through-holes 31d to 36d form the through-holes 30 of the upstream gasket 3 in the assembled state with the connecting part 93a of the cylinder head 93 and the upstream flange 42 of the exhaust manifold 4. As illustrated in FIG. 6, these upstream seal plates 31 to 36 are stacked on each other in the exhaust gas flow direction indicated by a reference numeral "12."

The structures of the upstream seal plates 31 to 36 are described by using the first upstream seal plate 31 as an example.

As illustrated in FIGS. 6 and 7, the first upstream seal plate 31 includes the through-holes 31d, annular-shaped inner circumferential portions 31a forming the through-holes 31d, annular-shaped intermediate portions 31b' located on the outer circumferential side of the inner circumferential portions 31a, and an outer circumferential portion 31c located on the further outer circumferential side of the intermediate portions 31b' and formed with bolt holes 31f.

The first upstream seal plate 31 secures excellent sealability of the upstream gasket 3. To improve the sealability in the periphery of the exhaust passage, each intermediate portion 31b' is formed with a bead portion 31b surrounding the through-hole 31. The bead portion 31b is a so-called half bead which is formed by bending the first upstream seal plate 31 at the intermediate portion 31b' to incline from the outer circumferential portion 31c to one side in thickness directions of the first upstream seal plate 31 (i.e., to the exhaust manifold 4 side in this embodiment), and also bending it at the inner circumferential portion 31a to be in parallel to the outer circumferential portion 31c. In the assembled state with the connecting part 93a and the upstream flange 42, a load is applied on the bead portion 31b by a bolt axial force in the direction opposite from the bending direction of the bead portion 31b to generate a surface pressure in the stacking direction, and thus, the excellent sealability is provided.

As illustrated in FIGS. 6 and 7, the upstream seal plates 33 and 35 have the same structure as the first upstream seal plate 31, and bead portions 33b and 35b are also formed by being bent toward the exhaust manifold 4. The upstream seal plates 32, 34, and 36 also have the same structure as the first upstream seal plate 31 except that bead portions 32b, 34b, and 36b are half beads of which bending directions are opposite from the bending direction of the first upstream seal plate 31, i.e., the bead portions 32b, 34b, and 36b are bent toward the cylinder head 93.

As illustrated in FIGS. 6 and 7, the upstream gasket 3 includes the insulator plate 38 disposed between the fifth and sixth upstream seal plates 35 and 36. The insulator plate 38 has an extended portion 38e that extends outwardly (in a direction intersecting with the stacking direction) at an outer circumferential side of the upstream gasket 3 (e.g., at an upper side and a right side of the upstream gasket 3), so as to cover a part of or the entire upper and right portions of the exhaust manifold 4.

As illustrated in FIG. 3, the insulator plate 38 covers the exhaust manifold 4 together with a heat insulator 69 disposed on the turbocharger 6 side thereof, and prevents a temperature drop of the exhaust gas inside the exhaust manifold 4. The shape and a length 38h (illustrated in FIG. 6) of the extended portion 38e of the insulator plate 38 are not particularly limited and may suitably be changed as long as the insulator plate 38 covers the exhaust manifold 4 together with the heat insulator 69.

As illustrated in FIGS. 6 and 7, the insulator plate 38 is formed with through-holes 38d at positions corresponding to the through-holes 31d to 36d of the upstream seal plates 31 to 36. The insulator plate 38 includes inner circumferential portions 38a forming the through-holes 38d, intermediate portions 38b' located on the outer circumferential side of the inner circumferential portions 38a, an outer circumferential portion 38c formed on the further outer circumferential side of the intermediate portions 38b' and formed with bolt holes 38f, and the extended portion 38e described above.

Note that the intermediate portion 38b' of the insulator plate 38 is not formed with a bead portion, and is flat (flat portion 38b).

According to this structure, an additional attaching part for attaching the insulator plate covering the exhaust manifold 4 is not required, and the discharge of heat from the exhaust manifold 4 is effectively prevented with a simple structure.

The insulator plate 38 of this embodiment may be disposed between any two of the upstream seal plates 31 to 36 constituting the upstream gasket 3. Preferably, to stably fix and hold the insulator plate 38, the insulator plate 38 is disposed between two plates of which outer circumferential portions (31c to 36c) are in contact with each other. More preferably, to effectively prevent the discharge of the heat of the exhaust gas from the exhaust manifold 4, especially toward the cylinder head 93, and also to prevent degradation of the sealability due to exposure to high-temperature exhaust gas, the insulator plate 38 is disposed between the upstream seal plates 35 and 36 which are the closest upstream seal plates to the cylinder head 93, as in this embodiment. In this manner, the sixth upstream seal plate 36 disposed between the connecting part 93a and the insulator plate 38 prevents the degradation of the sealability by utilizing the cooling effect of the water jacket provided in the cylinder head 93. Moreover, since the first to fifth upstream seal plates 31 to 35 are disposed between the exhaust manifold 4 and the insulator plate 38, i.e., since the number of seal plates are larger compared to that between the connecting part 93a and the insulator plate 38, the sealability degradation due to heat is prevented.

In view of the cost performance and to prevent the heat discharge from the exhaust manifold 4 to the cylinder head 93 side, the thicknesses of the upstream seal plates 31 to 36 and the insulator plate 38 may be set to 0.25 mm and 0.4 mm, respectively.

The materials of the upstream seal plates 31 to 36 and the insulator plate 38 are not particularly limited, but they are preferably a metal material having high hardness and excellent thermal resistance, for example, stainless steel is preferably used. The materials of the upstream seal plates 31 to 36 and the insulator plate 38 may be exactly the same as or different from each other.

Height lengths of the bead portions 31b to 36b of the upstream seal plates 31 to 36 in the stacking direction may be the same as or different from each other. Further, widths of the bead portions 31b to 36b of the upstream seal plates 31 to 36 in radial directions thereof may be the same as or different from each other; however, in order to improve the sealability of the upstream gasket 3, they are preferably the same as each other. Note that as illustrated in FIG. 6, to improve the sealability, the bead portions 31b to 36b are preferably formed on the inner circumferential side of the upstream gasket 3, particularly, close to the through-holes 31d to 36d, and all the bead portions 31b to 36b are preferably disposed at the same position as each other in the radial directions thereof in a plan view. Here, distances from the through-holes 31d to 36d to the bead portions 31b to 36b, i.e., the widths of the inner circumferential portions 31a to 36a of the upstream seal plates 31 to 36 are, for example, 2.0 mm to 4.0 mm.

<Downstream Gasket>

The downstream gasket 5 improves sealability on the internal gas passage 41 of the exhaust manifold 4 and the turbine scroll 62 of the turbocharger 6, and prevents leakage of the exhaust gas from the connected part between the exhaust manifold 4 and the turbocharger 6.

Figure 8:
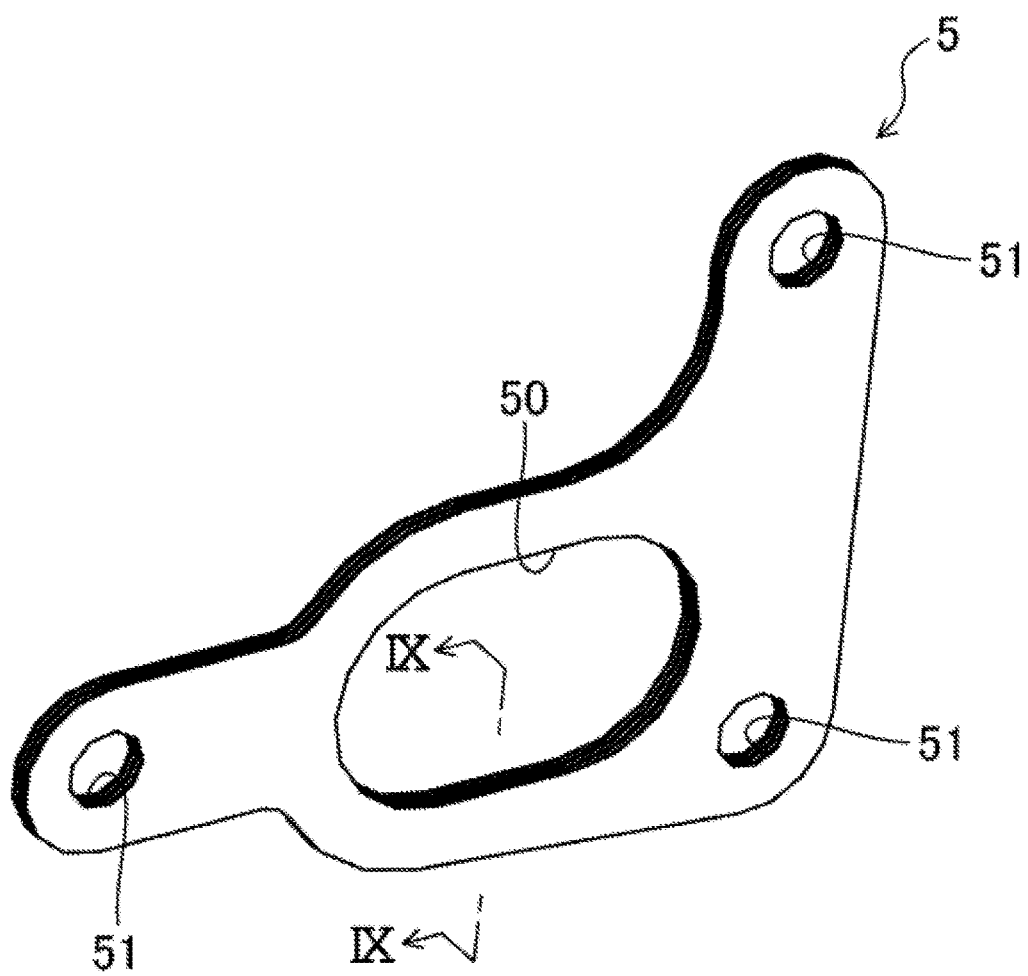
FIG. 8 is a perspective view of a downstream gasket of FIG. 4.
Figure 9:
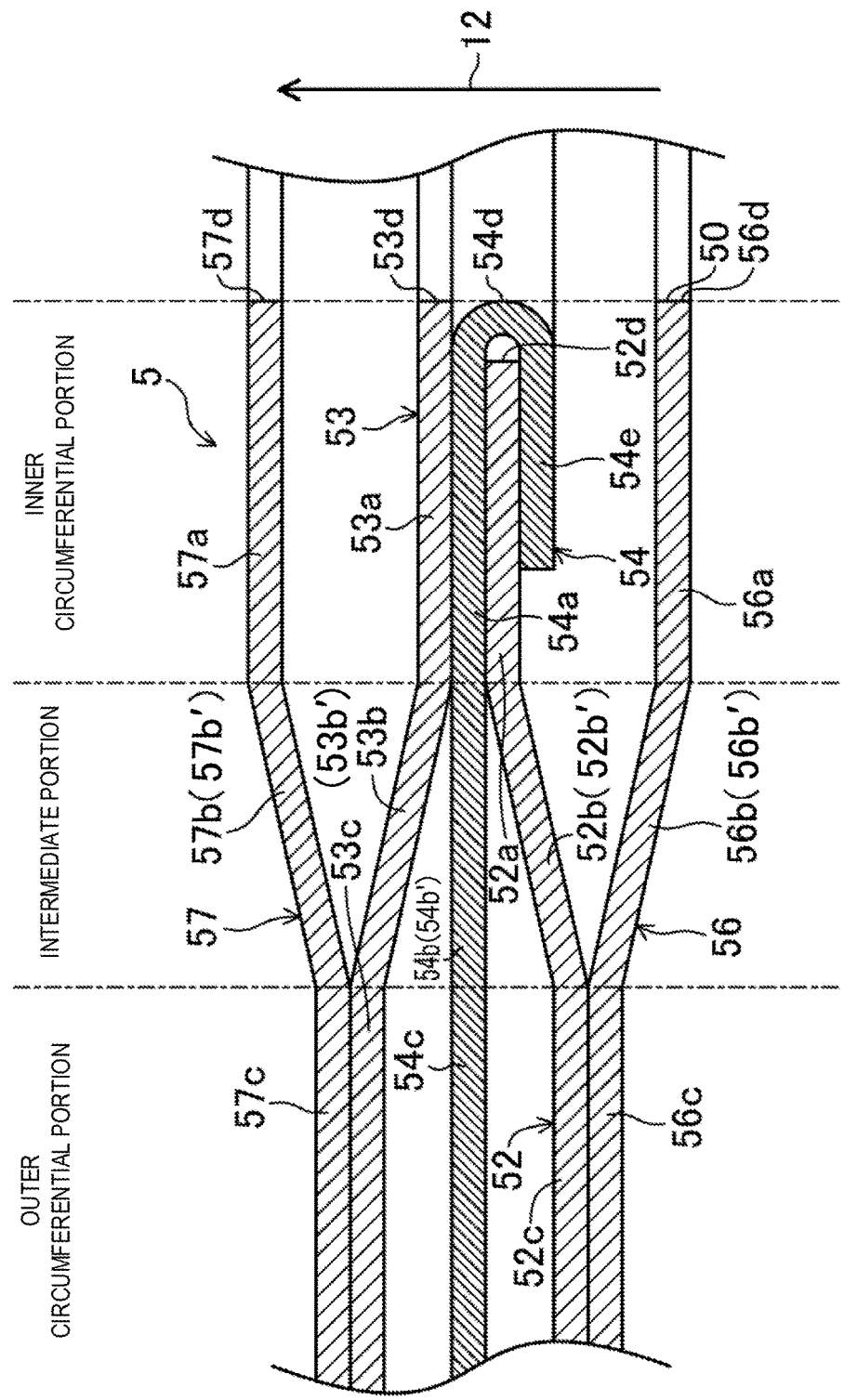
FIG. 9 is a cross-sectional view of the downstream gasket taken along the line IX-IX of FIG. 8.
Figure 10:
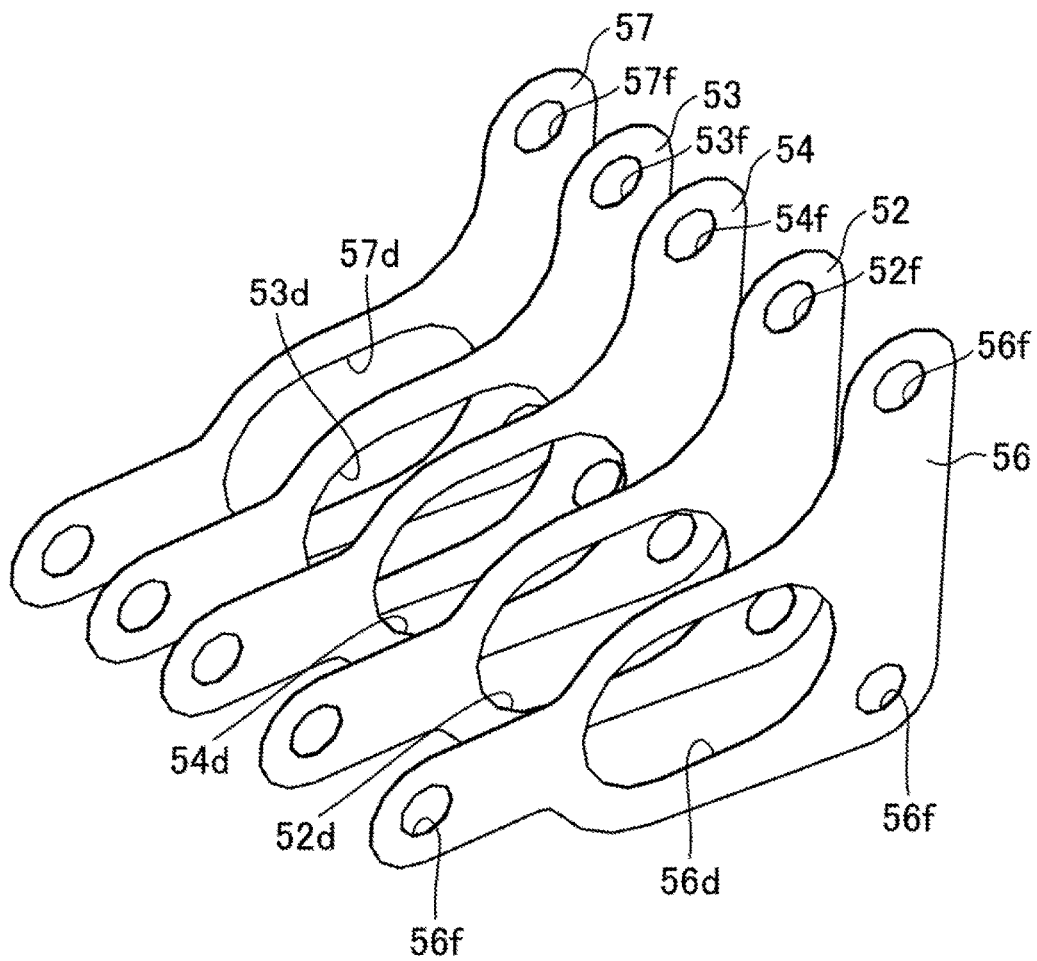
FIG. 10 is an exploded perspective view illustrating a stacking structure of the downstream gasket of FIG. 8.

Specifically, as illustrated in FIGS. 8 to 10, the downstream gasket 5 has a substantially annular structure having a through-hole 50 at an inner circumferential side. A plurality of bolt holes 51 are formed on an outer circumferential side of the through-hole 50 to spread therearound. As illustrated in FIGS. 3 and 4, the downstream gasket 5 is disposed between the downstream flange 43 of the exhaust manifold 4 and the exhaust-manifold-side flange 67 of the turbocharger 6, and assembled with them by fastening a plurality of bolts (not illustrated) through the plurality of bolt holes. In the assembled state, the exhaust passage (third exhaust passage) is formed within the through-hole 50 formed at the inner circumferential side of the downstream gasket 5.

As illustrated in FIG. 9, the downstream gasket 5 includes four downstream seal plates and a grommet plate 54 disposed between two of the downstream seal plates. The four downstream seal plates include a first downstream seal plate 52, a second downstream seal plate 53, a third downstream seal plate 56, and a fourth downstream seal plate 57 (hereinafter, may comprehensively be referred to as "the downstream seal plates 52, 53, 56, and 57).

In the state where the downstream gasket 5 is assembled with the downstream flange 43 and the exhaust-manifold-side flange 67, the downstream seal plates 52, 53, 56, 57 and the grommet plate 54 include through-holes 52d, 53d, 56d, and 57d and a passage hole 54d forming the exhaust passage; inner circumferential portions 52a, 53a, 56a, 57a and an inner circumferential portion 54a forming the through-holes 52d, 53d, 56d, and 57d and the passage hole 54d; a plurality of bolt holes 52f, 53f, 56f, and 57f formed surrounding the passage holes 54d, 52d, 53d, 56d, and 57d; a plurality of bolt holes 54f formed surrounding the passage hole 54d; outer circumferential portions 52c, 53c, 54c, 56c, and 57c formed with the plurality of bolt holes 52f, 53f, 54f, 56f, and 57f; and intermediate portions 52b', 53b', 54b', 56b', and 57b' disposed between the inner circumferential portions 52a, 53a, 54a, 56a, and 57a and the outer circumferential portions 52c, 53c, 54c, 56c, and 57c, respectively. The through-holes 52d, 53d, 56d, and 57d and the passage hole 54d constitute the through-hole 50 of the downstream gasket 5 in the assembled state with the flanges 43 and 67. Further, the plurality of bolt holes 52f, 53f, 54f, 56f, and 57f constitute the plurality of bolt holes 51 of the downstream gasket 5 in the assembled state. Moreover, the intermediate portions 52b', 53b', 56b', and 57b' of the downstream seal plates 52, 53, 56, and 57 are formed with bead portions 52b, 53b, 56b, and 57b (described later), respectively.

The grommet plate 54 is disposed at a center of the downstream seal plates 52, 53, 56, and 57 in a stacking direction thereof. The first and third downstream seal plates 52 and 56 are stacked in this order from the grommet plate 54, on one side of the grommet plate 54 in its thickness directions, e.g., on the exhaust manifold 4 side which is the upstream side. Further, the second and fourth downstream seal plates 53 and 57 are stacked in this order from the grommet plate 54, on the other side of the grommet plate 54, i.e., on the turbocharger 6 side which is the downstream side. Note that before the downstream gasket 5 is assembled with the two flanges 43 and 67, the downstream gasket 5 is fixed by, for example, self-clinching fasteners, such as rivets or studs and nuts (not illustrated), inserted through fixing holes formed in fixing parts provided at the outer circumference of the downstream seal plates 52, 53, 56, 57 and the grommet plate 54, or by crimping the corresponding part without requiring the fixing holes, so as to keep the stacked state thereof.

The grommet plate 54 improves the strength and durability of the downstream gasket 5. The grommet plate 54 has the inner circumferential portion 54a, the intermediate portion 54b', the outer circumferential portion 54c, and the passage hole 54d forming the exhaust passage together with the through-holes 52d, 53d, 56d, and 57d of the downstream seal plates 52, 53, 56, and 57 as described above. The intermediate portion 54b' forms a flat portion 54b between the inner circumferential portion 54a and the outer circumferential portion 54c. Further, a portion of the grommet plate 54 on the passage hole 54d side of the inner circumferential portion 54a is folded back to form a folded portion 54e covering a downstream seal plate adjacent thereto (in this embodiment, the first inner circumferential portions 52a forming the through-hole 52d of the first downstream seal plate 52). The inner circumferential portion 52a of the first downstream seal plate 52 is sandwiched by the inner circumferential portion 54a and the folded portion 54e. Exhaust gas at a high temperature of, for example, about 700° C. to 850° C. flows into the exhaust manifold 4 from the exhaust ports 2. Even when the downstream gasket 5 is fastened between the flanges 43 and 67, and the bead portions 52b, 53b, 56b, and 57b are exposed to the high-temperature exhaust gas while being crushed by the bolt fastening axial force, since the folded portion 54e is provided, the bead portion 52b of the first downstream seal plate 52 is not completely crushed and a surface pressure of the bead portion 52b is maintained. Thus, the degradation of the sealability of the downstream gasket 5 as a whole is prevented. As illustrated in FIG. 9, the folded portion 54e may be folded back to the exhaust manifold 4 side which is on the upstream side in the exhaust gas flow direction inside the exhaust passage formed by the through-hole 50. The folded portion 54e may be folded back on the supercharger 6 side which is the downstream side; however, the folded portion 54e is preferably folded back to the exhaust manifold 4 side since thermal deformation of the flange is relatively larger on the exhaust manifold 4 side due to the exposure to the relatively high-temperature exhaust gas. To secure the surface pressure generated by the bead portion 52b of the first downstream seal plate 52 and obtain suitable sealability of the downstream gasket 5 when the downstream gasket 5 is assembled with the flanges 43 and 67, before the downstream gasket 5 is assembled with the flanges 43 and 67, a thickness of the folded portion 54e of the grommet plate 54 is preferably thinner than a height of the bead portion 52b of the first downstream seal plate 52 (described later).

The first downstream seal plate 52 secures excellent sealability of the downstream gasket 5. To improve the sealability in the periphery of the exhaust passage, the intermediate portion 52b' is formed with the bead portion 52b surrounding the through-hole 52d. The bead portion 52b is a so-called half bead which is formed by bending the first downstream seal plate 52 at the intermediate portion 52b' to incline from the outer circumferential portion 52c to one side in thickness directions of the first downstream seal plate 52 (i.e., to the turbocharger 60 side in this embodiment), and also bending it at the inner circumferential portion 52a to be in parallel to the outer circumferential portion 52c. In the assembled state, a load is applied on the bead portion 52b by the bolt axial force in the opposite direction from the bending of the bead portion 52b to generate the surface pressure in the stacking direction, thus the excellent sealability is provided. Before the downstream gasket 5 is assembled with the flanges 43 and 67, the height length of the bead portion 52b in the stacking direction is not particularly limited, and it may be 0.2 mm to 1.0 mm, for example. The inner circumferential portion 52a of the first downstream seal plate 52 is sandwiched by the inner circumferential portion 54a and the folded portions 54e of the grommet plate 54 as described above. Further, before the downstream gasket 5 is assembled with the flanges 43 and 67, as illustrated in FIG. 9, the outer circumferential portion 54c and the outer circumferential portion 52c of the first downstream seal plate 52 have a gap therebetween corresponding to the height length of the bead portion 52b.

The second downstream seal plate 53 secures the excellent sealability of the downstream gasket 5. To improve the sealability in the periphery of the exhaust passage, the intermediate portion 53b' is formed with the bead portion 53b surrounding the through-hole 53d. The bead portion 53b is a so-called half bead which is formed by bending the second downstream seal plate 53 at the intermediate portion 53b' to incline from the outer circumferential portion 53c to one side in thickness directions of the second downstream seal plate 53 (i.e., to the exhaust manifold 4 side in this embodiment), and also bending it at the inner circumferential portion 53a to be in parallel to the outer circumferential portion 53c. In the assembled state, a load is applied on the bead portion 53b by the bolt fastening axial force in the opposite direction from the bending of the bead portion 53b to generate the surface pressure in the stacking direction, thus the excellent sealability is provided. The second downstream seal plate 53 is stacked on the side of the grommet plate 54 opposite from the first downstream seal plate 52, i.e., the first and second downstream seal plates 52 and 53 are stacked on both sides of the grommet plate 54. The inner circumferential portion 53a of the second downstream seal plate 53 contacts with the grommet plate 54 in the assembled state. The bead portion 53b has a height from the grommet plate 54 to the side opposite from the bead portion 52b of the first downstream seal plate 52 in the stacking direction.

The third downstream seal plate 56 secures the excellent sealability and durability of the downstream gasket 5. To improve the sealability in the periphery of the exhaust passage, the intermediate portion 56b' is formed with the bead portion 56b surrounding the through-hole 56d. The bead portion 56b is a so-called half bead which is formed by bending the third downstream seal plate 56 at the intermediate portion 56b' to incline from the outer circumferential portion 56c to one side in thickness directions of the third downstream seal plate 56 (i.e., to the exhaust manifold 4 side in this embodiment), and also bending it at the inner circumferential portion 56a to be in parallel to the outer circumferential portion 56c. In the assembled state, a load is applied on the bead portion 56b by the bolt axial force in the opposite direction from the bending of the bead portion 56b to generate the surface pressure in the stacking direction, thus the excellent sealability is provided. The third downstream seal plate 56 is stacked on the first downstream seal plate 52 on the side opposite from the grommet plate 54. When the downstream gasket 5 is assembled with the flanges 43 and 67, the folded portion 54e of the grommet plate 54 contacts with the inner circumferential portion 56a of the third downstream seal plate 56. Thus, even after the bolts are fastened, the excellent long-term sealability is maintained without completely crushing the bead portion 52b of the first downstream seal plate 52. Moreover, since the first downstream seal plate 52 and the folded portion 54e of the grommet plate 54 are not directly exposed to the high-temperature exhaust gas, the durability of the downstream gasket 5 improves.

The fourth downstream seal plate 57 secures the excellent sealability and durability of the downstream gasket 5. To improve the sealability in the periphery of the exhaust passage, the intermediate portion 57b' is formed with the bead portion 57b surrounding the through-hole 57d. The bead portion 57b is a so-called half bead which is formed by bending the fourth downstream seal plate 57 at the intermediate portion 57b' to incline from the outer circumferential portion 57c to one side in thickness directions of the fourth downstream seal plate 57 (i.e., to the turbocharger 6 side in this embodiment) and also bending it at the inner circumferential portion 57a to be in parallel to the outer circumferential portion 57c. In the assembled state, a load is applied on the bead portion 57b by the bolt axial force in the opposite direction from the bending of the bead portion 57b to generate the surface pressure in the stacking direction, thus the excellent sealability is provided. The fourth downstream seal plate 57 has the bead portion 57b at the inner circumferential side and is stacked on the second downstream seal plate 53 on the opposite side from the grommet plate 54.

Although thicknesses of the downstream seal plates 52, 53, 56, and 57 and the grommet plate 54 in the stacking direction are not particularly limited, to improve the sealability of the downstream gasket 5, it may be 0.25 mm to 0.3 mm, for example.

The materials of the downstream seal plates 52, 53, 56, and 57 and the grommet plate 54 are not particularly limited; however, they are preferably a metal material having high hardness and excellent thermal resistance, for example, stainless steel is preferably used.

The height lengths of the bead portions 52b, 53b, 56b, and 57b of the downstream seal plates 52, 53, 56, and 57 in the stacking direction may be the same as or different from each other. Further, the widths of the bead portions 52b, 53b, 56b, and 57b of the downstream seal plates 52, 53, 56, and 57 in radial directions thereof may be the same as or different from each other; however, in order to improve the sealability of the downstream gasket 5, they are preferably the same as each other. Note that as illustrated in FIG. 9, to improve the sealability, the bead portions 52b, 53b, 56b, and 57b are preferably formed on the inner circumferential side of the downstream gasket 5, particularly, close to the through-holes 52d, 53d, 56d, and 57d, and all the bead portions 52b, 53b, 56b, and 57b are preferably disposed at the same position as each other in the radial directions in a plan view. Here, distances from the through-holes 52d, 53d, 56d, and 57d to the bead portions 52b, 53b, 56b, and 57b, i.e., the widths of the inner circumferential portions 52a, 53a, 56a, and 57a of the upstream seal plates 31 to 36 are, for example, 2.0 mm to 4.0 mm. Note that as illustrated in FIG. 9, the width of the inner circumferential portion 52a of the first downstream seal plate 52 may be narrower than widths of the inner circumferential portions 53a, 56a, and 57a of the other downstream seal plates 53, 56, and 57, and the width of the entire folded structure formed by the folded portion 54e of the grommet plate 54 may be made equal to the widths of the inner circumferential portions 53a, 56a, and 57a. In this case, the width of the folded portion 54e is preferably set so that the folded portion 54e does not reach the bead portion 52b, for example, 1.5 mm to 3.5 mm.

The inner circumferential portions 52a, 53a, 56a, and 57a forming the through-holes 52d, 53d, 56d, and 57d of the downstream gasket 5 may deteriorate due to the exposure to the high-temperature exhaust gas flowing through the through-holes 52d, 53d, 56d, and 57d, and the sealability of the downstream gasket 5 may degrade. According to the structure of this embodiment, since the passage hole side of the grommet plate is folded to cover the inner circumferential portion of another seal plate, thermal deterioration of the seal plate is prevented, and the excellent long-term sealability is maintained.

<Characteristics of Exhaust Device of this Embodiment>

The material and thickness of the upstream seal plate of the upstream gasket are substantially the same as that of the downstream seal plate of the downstream gasket. The number of the upstream seal plates is six while the number of the downstream seal plates is four, in other words, the number of the upstream seal plates is set larger than the downstream seal plates.

As described above, at the engine start, since the heat of the exhaust gas is easily absorbed by the coolant on the cylinder head side from the exhaust manifold, which is air-cooled, the reaction of the exhaust gas catalyst device disposed on the downstream side may be slowed down.

According to the structure of this embodiment, the thermal resistance in the exhaust gas flow direction indicated by the reference numeral "12" becomes higher at the upstream gasket 3 than at the downstream gasket 5. Thus, the absorption of the heat of the exhaust gas by the cylinder head 93 from the exhaust manifold 4 is prevented. As a result, the heat of the exhaust gas flowing downstream from the exhaust manifold 4 is retained, and the turbocharger 6 and the catalyst device 7 are promptly warmed up to stimulate the catalytic reaction.

Note that the thermal resistances of the upstream gasket 3 and the downstream gasket 5 in the exhaust gas flow direction are adjustable with a simple structure by adjusting the numbers of the upstream seal plates and the downstream seal plates. The number of upstream seal plates and the number of downstream seal plates are not particularly limited as long as the former number is larger than the latter number. To secure the suitable sealability and in view of the cost performance in manufacturing while preventing the temperature drop of the exhaust gas, the number of upstream seal plates is preferably 4 to 12, more preferably 4 to 10, and even more preferably 6 to 8, and the number of downstream seal plates is preferably 2 to 10, more preferably 2 to 8, even more preferably 4 to 6, so that the number of the upstream seal plates is larger than the number of the downstream seal plates by 2 to 4 plates.

Next, other embodiments according to the present invention are described in detail. In the description of the following embodiments, the same parts as those of the first embodiment are denoted with the same reference characters, and a detailed description is omitted.

Second Embodiment

In the first embodiment, the materials and thicknesses of the upstream seal plates and the downstream seal plates are substantially the same as each other and the numbers of the upstream and downstream seal plates are adjustable. When the thermal resistance of the upstream gasket 3 in the exhaust gas flow direction is larger than the thermal resistance of the downstream gasket 5 in the same direction, different structures may be adopted. For example, the numbers and thicknesses of the upstream seal plates and the downstream seal plates may be set to be the same as each other, while the materials thereof may be different from each other, and the thermal resistance of the upstream seal plates in the exhaust gas flow direction may be larger than that of the downstream seal plates. Thus, the thicknesses of the upstream and downstream gaskets 3 and 5 in the stacking direction may be set to be the same as each other. As a result, by adjusting the materials of the upstream and downstream gaskets 3 and 5, the difference between the thermal resistances thereof may be set larger, which effectively prevents the discharge of heat from the exhaust manifold 4 to the cylinder head 93 side.

Third Embodiment

Further, to simplify the manufacturing process, the materials and numbers of the upstream and downstream seal plates may be the same, the plate thicknesses in the stacking direction may be adjusted so that the upstream seal plates become thicker than the downstream seal plates. For example, the thickness of each upstream seal plate is preferably 0.2 mm to 0.6 mm, more preferably 0.22 mm to 0.5 mm or 0.24 mm to 0.4 mm. The thickness of each downstream seal plate is preferably 0.15 mm to 0.5 mm, more preferably 0.17 mm to 0.4 mm or 0.2 mm to 0.3 mm. The upstream seal plate may be thicker than the downstream seal plate by 5% to 25%.

According to this structure, the upstream gasket 3 becomes thicker than the downstream gasket 5 in the exhaust gas flow direction, and the thermal resistance of the upstream gasket 3 in the exhaust gas flow direction is adjusted to be larger than that of the downstream gasket 5 with a simple structure. As a result, the discharge of heat from the exhaust manifold 4 is effectively prevented.

Fourth Embodiment

Figure 11:
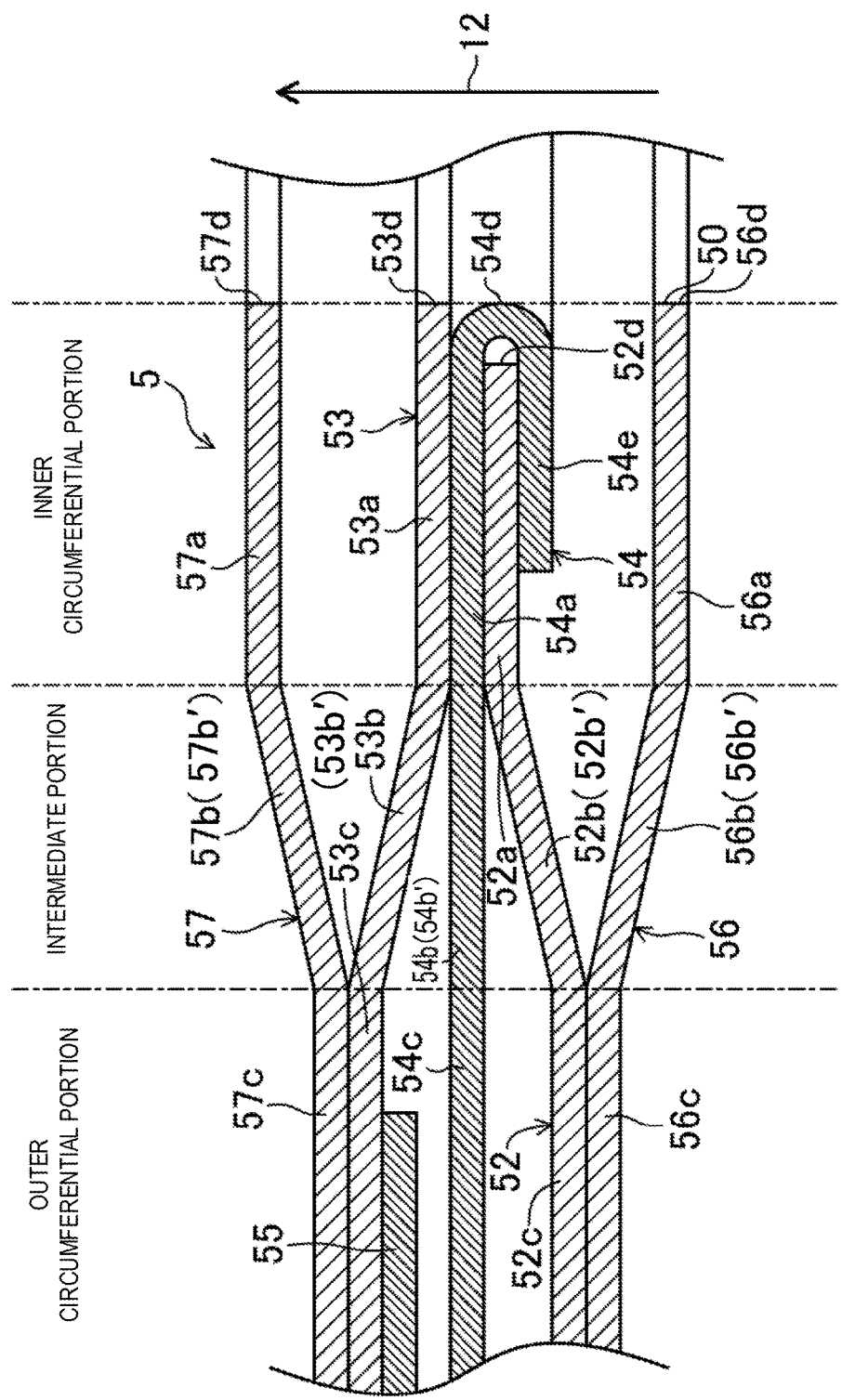
FIG. 11 is a view corresponding to FIG. 9, illustrating a downstream gasket applied to an exhaust device according to a fourth embodiment of the present invention.

As illustrated in FIG. 11, the downstream gasket 5 may include a spacer plate 55 between the grommet plate 54 and the second downstream seal plate 53. The spacer plate 55 is provided on the outer circumferential side of the bead portion 53b of the second downstream seal plate 53 so as to extend over the entire circumferences thereof and the bolt holes 51.

In other words, the spacer plate 55 is formed over the entire circumferences of the outer circumferential portions 53c and 54c and all of the plurality of bolt holes 51, in the outer circumferential portions 53c and 54c of the second downstream seal plate 53 and the grommet plate 54. In other words, a thorough-hole larger than the through-hole 50 is formed at a center of the spacer plate 55, and the spacer plate 55 is disposed between the grommet plate 54 and the second downstream seal plate 53, so that when the downstream gasket 5 is assembled with the flanges 43 and 67, both sides of the spacer plate 55 in the stacking direction only contact with the outer circumferential portions 53c and 54c of the second downstream seal plate 53 and the grommet plate 54, respectively.

In the above embodiments, the number of plates at the through-hole 50 side of the downstream gasket 5 where the exhaust passage is formed is six including the first downstream seal plate 52, the second downstream seal plate 53, the grommet plate 54, the third downstream seal plate 56, and the fourth downstream seal plate 57, since the grommet plate 54 is provided with the folded portion 54e. On the other hand, the number of plates at the outer circumferential side of the downstream gasket 5 where the bolt holes 51 are formed is five. Thus, the number of plates is less on the outer circumferential side than the exhaust passage side. Therefore, when one bolt is fastened in the process of fastening the plurality of bolts, the folded portion 54e of the grommet plate 54 may be in a partial contact state with the third downstream seal plate 56 on the downstream flange 43 side, and the exhaust-manifold-side flange 67 may tilt with respect to the downstream flange 43. In this manner, when the rest of the bolts are fastened, the fastening of the bolts may be insufficient, thus the surface pressures may not sufficiently be produced by the bead portions.

In the downstream gasket 5 of this embodiment, since the spacer plate 55 that is thinner than the folded portion 54e is provided around the bolt holes 51, the number of plates on the exhaust passage side is set to the same as the number of plates on the bolt side. Thus, the partial contact state of the folded portion 54e of the grommet plate 54 is eliminated and the interval between the flanges 43 and 67 is kept constant. An end portion of the spacer plate 55 on the through-hole 55d side and an end portion of the folded portion 54e of the grommet plate 54 on the opposite side from the through-hole 54d are provided with a given distance therebetween so that the end portion of the spacer plate 55 on the through-hole 55d side is located on the outer circumferential side of an end portion of the bead portion 53b on the opposite side from the through-hole 53d, i.e., the fold starting position. Thus, when the downstream gasket 5 is assembled with the flanges 43 and 67, the bead portions 52b, 53b, 56b, and 57b generate sufficient and substantially even surface pressures, which as a result, improve the sealability of the downstream gasket 5. If the end portion of the bead portion 53b on the opposite side from the through-hole 53d and the end portion of the spacer plate 55 on the through-hole 55d side match with each other, there is a possibility that the bead portion may not successfully be crushed when the bolts are fastened. Since the spacer plate 55 is provided to extend over the entire circumferences including the circumferences of the bolt holes 51, the excellent sealability of the downstream gasket 5 is effectively secured.

Note that to alleviate the partial contact state of the folded portion 54e of the grommet plate 54, the spacer plate 55 may be provided between the grommet plate 54 and either one of the first and second downstream seal plates 52 and 53. Preferably, the spacer plate 55 is disposed on the side of the grommet plate 54 on the opposite side from the first downstream seal plate 52, that is, the opposite side from the folding direction of the folded portion 54e of the grommet plate 54, as in the structure of this embodiment. With this structure, the surface pressure is effectively generated by the bead portion 52b of the first downstream seal plate 52 when the bolts are fastened, and thus the one-way contact state of the folded portion 54e is alleviated and the sealability of the gasket is evenly exerted over the periphery of the through-hole 50. Since the spacer plate 55 is thinner than the folded portion 54e, when the exhaust gas flows, the folded portion 54e functions as a bead portion. In the case where the folded portion 54e of the grommet plate 54 is folded to the second downstream seal plate 53 side, the spacer plate 55 is preferably disposed between the grommet plate 54 and the first downstream seal plate 52.

Although the material of the spacer plate 55 is not particularly limited, it is preferably a metal material having high hardness and excellent thermal resistance, for example, stainless steel is preferably used. The thicknesses of the spacer plate 55 in the stacking direction of the downstream seal plates 52, 53, 56, and 57 are preferably equal to or less than the thickness of the folded portion 54e of the grommet plate 54 and also not significantly different therefrom, for example, they may be 0.1 mm to 0.3 mm.

Other Embodiments

In the above embodiments, the upstream gasket 3 is not provided with a grommet plate. However, to prevent the deterioration of the upstream gasket 3 due to the high-temperature exhaust gas, a grommet plate may be disposed between two of the upstream seal plates 31 to 36 and the insulator plate 38, and provided with a folded portion to cover inner circumferential portions of the two of these plates. Further, the grommet plate may be provided only to the upstream gasket 3.

When the upstream gasket 3 includes the grommet plate, a spacer plate may also be provided.

In the above embodiments, the downstream gasket 5 is not provided with an insulator plate; however, an insulator plate having an extended portion extending outwardly (in a direction intersecting with the stacking direction) of the downstream gasket 5 may be disposed between two of the downstream seal plates 52, 53, 56, and 57; the grommet plate 54; and the spacer plate 55 (if provided). Further, the insulator plate may be provided only to the downstream gasket 5. Thus, an additional attaching part for attaching the insulator plate covering the exhaust manifold 4 is not required to be provided on the turbocharger 6 side, and the discharge of heat from the exhaust manifold 4 is effectively prevented with a simple structure.

In the above embodiments, the downstream gasket 5 is applied to the diesel engine E of the automobile; however, the downstream gasket 5 may be applied to other types of gasoline engines.

By structuring the upstream gasket to have the larger thermal resistance than that of the downstream gasket, the absorption of the heat of the exhaust gas by the cylinder head from the exhaust manifold at the engine start is prevented. This is extremely useful in maintaining the heat of the exhaust gas flowing downstream from the exhaust manifold, and promptly warming up the exhaust path constituting part and the exhaust gas purifying catalyst device to stimulate the catalytic reaction.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Exhaust Device
2 Exhaust Port
2A First Exhaust Port
2B Second Exhaust Port
2C Third Exhaust Port
2D Fourth Exhaust Port
3 Upstream Gasket
4 Exhaust Manifold 5 Downstream Gasket
6 Turbocharger (Exhaust Path Constituting Part)
7 Catalyst Device (Exhaust Gas Purifying Catalyst Device)
22, 22A, 22B, 22C, 22D Downstream Open End (of Exhaust Port)
31d, 32d, 33d, 34d, 35d, 36d Through-hole
31 First Upstream Seal Plate (Upstream Seal Plate)
32 Second Upstream Seal Plate (Upstream Seal Plate)
33 Third Upstream Seal Plate (Upstream Seal Plate)
34 Fourth Upstream Seal Plate (Upstream Seal Plate)
35 Fifth Upstream Seal Plate (Upstream Seal Plate)
36 Sixth Upstream Seal Plate (Upstream Seal Plate)
38 Insulator Plate
38e Extended Portion
41 Internal Gas Passage (First Exhaust Passage)
42 Upstream Flange (Upstream Connecting Member)
43 Downstream Flange (Downstream Connecting Member)
52 First Downstream Seal Plate (Downstream Seal Plate)
52a Inner Circumferential Portion (of First Downstream Seal Plate)
52b Bead Portion (of First Downstream Seal Plate)
52b' Intermediate Portion (of First Downstream Seal Plate)
52c Outer Circumferential Portion (of First Downstream Seal Plate)
52d Through-hole (of First Downstream Seal Plate)
52f Bolt Hole (of First Downstream Seal Plate)
53 Second Downstream Seal Plate (Downstream Seal Plate)
53a Inner Circumferential Portion (of Second Downstream Seal Plate)
53b Bead Portion (of Second Downstream Seal Plate)
53b' Intermediate Portion (of Second Downstream Seal Plate)
53c Outer Circumferential Portion (of Second Downstream Seal Plate)
53d Through-hole (of Second Downstream Seal Plate)
53f Bolt Hole (of Second Downstream Seal Plate)
56 Third Downstream Seal Plate (Downstream Seal Plate)
56a Inner Circumferential Portion (of Third Downstream Seal Plate)
56b Bead Portion (of Third Downstream Seal Plate)
56b' Intermediate Portion (of Third Downstream Seal Plate)
56c Outer Circumferential Portion (of Third Downstream Seal Plate)
56d Through-hole (of Third Downstream Seal Plate)
56f Bolt Hole (of Third Downstream Seal Plate)
57 Fourth Downstream Seal Plate (Downstream Seal Plate)
57a Inner Circumferential Portion (of Fourth Downstream Seal Plate)
57b Bead Portion (of Fourth Downstream Seal Plate)
57b' Intermediate Portion (of Fourth Downstream Seal Plate)
57c Outer Circumferential Portion (of Fourth Downstream Seal Plate)
57d Through-hole (of Fourth Downstream Seal Plate)
57f Bolt Hole (of Fourth Downstream Seal Plate)
54 Grommet Plate
54a Inner Circumferential Portion (of Grommet Plate)
54b Flat Portion (of Grommet Plate)
54b' Intermediate Portion (of Grommet Plate)
54c Outer Circumferential Portion (of Grommet Plate)
54d Passage Hole (of Grommet Plate)
54e Folded Portion (of Grommet Plate)
54f Bolt Hole (of Grommet Plate)
62 Turbine Scroll (Second Exhaust Passage)
63 Turbine Flow-out Passage (Second Exhaust Passage)
67 Exhaust-manifold-side Flange (Exhaust-manifold-side Connecting Member)
69 Heat Insulator
91 Cylinder
91A First Cylinder
91B Second Cylinder
91C Third Cylinder
91D Fourth Cylinder
92 Cylinder Block
93 Cylinder Head
93a Connecting Part (of Cylinder Head)
94 Intake Aperture
94C Third Intake Aperture
95 Exhaust Aperture
95C Third Exhaust Aperture
96 Intake Port
96C Third Intake Port
97 Intake Valve
97C Third Intake Valve
98 Exhaust Valve
98C Third Exhaust Valve
99 Injector
99C Third Injector
100 Combustion Chamber
100A First Combustion Chamber
100B Second Combustion Chamber
100C Third Combustion Chamber
100D Fourth Combustion Chamber
E Engine

What is claimed is:

1. An exhaust device of an engine, comprising:
an exhaust port formed in a cylinder head and connected to an exhaust aperture of a cylinder at a first open end;
an exhaust manifold disposed on a side surface of the cylinder head and formed with a first exhaust passage connected to a second open end of the exhaust port opposite from the first open end;
an exhaust path constituting part disposed on a side of the exhaust manifold opposite from the cylinder head, and formed with a second exhaust passage connected to a downstream end of the first exhaust passage;
an exhaust gas purifying catalyst device disposed on a downstream side of the exhaust path constituting part;
an upstream gasket disposed between the side surface of the cylinder head and an upstream connecting member of the exhaust manifold;
a downstream gasket disposed between a downstream connecting member of the exhaust manifold and an exhaust-manifold-side connecting member of the exhaust path constituting part, the upstream gasket having a larger thermal resistance in an exhaust gas flow direction than the downstream gasket, wherein
the upstream gasket includes a plurality of upstream seal plates stacked in a direction parallel to the exhaust gas flow direction, each of the plurality of upstream seal plates being formed with a through-hole to form a third exhaust passage therein,
the downstream gasket includes a plurality of downstream seal plates stacked in a direction parallel to the exhaust gas flow direction, each of the plurality of downstream seal plates being formed with a through-hole to form the third exhaust passage therein,
the plurality of upstream seal plates and the plurality of downstream seal plates are made from substantially the same materials and have substantially the same thicknesses, and
a number of the plurality of upstream seal plates is larger than a number of the plurality of downstream seal plates.

2. The device of claim 1, wherein
the upstream and downstream gaskets are made from substantially the same materials, and
the upstream gasket is thicker than the downstream gasket in the exhaust gas flow direction.

3. The device of claim 1, wherein
the downstream gasket includes a grommet plate disposed between two of the plurality of downstream seal plates,
the grommet plate is formed with a passage hole forming the third exhaust passage together with the through-holes of the plurality of downstream seal plates, and
the grommet plate is provided with a folded portion formed at a passage hole side by folding the grommet plate to cover an inner circumferential portion of one downstream seal plate adjacent to the grommet plate, the inner circumferential portion forming the through-hole.

4. The device of claim 1, wherein the upstream gasket includes an insulator plate having an extended portion extending outwardly of the upstream gasket and disposed between two of the plurality of upstream seal plates.

* * * * *